US005459917A

United States Patent [19]

Smith

[11] Patent Number: 5,459,917

[45] Date of Patent: Oct. 24, 1995

[54] METHOD AND TOOL FOR REMOVING SPIKED METAL PLATES FROM WOOD MEMBERS

[76] Inventor: Ulys Smith, Rte. 16, Box 27, Greenville, N.C. 27858

[21] Appl. No.: 176,898

[22] Filed: Jan. 3, 1994

[51] Int. Cl.[6] .............................. B23P 19/00; B25C 11/00

[52] U.S. Cl. .................... 29/426.5; 29/426.4; 29/897.31; 254/25; 254/131

[58] Field of Search ................................ 29/426.4, 426.5, 29/897.31, 897.312; 254/18, 21, 25, 26 R, 131

[56] References Cited

U.S. PATENT DOCUMENTS

| | | | |
|---|---|---|---|
| 1,508,489 | 9/1924 | Vlchek | 254/25 |
| 1,559,976 | 9/1925 | Ness | 254/131 |
| 3,074,694 | 1/1963 | Erickson, Jr. | 254/131 X |
| 5,176,363 | 1/1993 | Bowlin | 254/131 |

*Primary Examiner*—S. Thomas Hughes
*Attorney, Agent, or Firm*—Rhodes, Coats & Bennett

[57] ABSTRACT

A tool is provided that includes a claw head wherein the claw head includes a plurality of laterally spaced claw fingers. The claw fingers are particularly sized and spaced such that they can be projected down through the exposed side of a spiked metal connecting plate and particularly through the perforated openings formed therein. More particularly, the claw fingers are designed such that the entire tool and claw head is effective to remove or peel the spiked metal connecting plate from one or more connecting wood members.

7 Claims, 4 Drawing Sheets

METHOD AND TOOL FOR REMOVING SPIKED METAL PLATES FROM WOOD MEMBERS

FIELD OF INVENTION

The present invention relates to tools and more particularly to a tool designed to remove spiked metal connecting plates that are typically anchored into one or more wood members. The present invention also relates to a method for removing perforated and spiked metal connecting plates from adjoining wood members.

BACKGROUND OF THE INVENTION

In the building industry, perforated spiked metal connecting plates are typically utilized to connect wood members together. For example, it is commonplace in the truss industry to connect wood components of a truss with a perforated, spiked metal connecting plate. It is common to utilize a plurality of such perforated, spiked metal connecting plates in fabricating an elongated truss (roof or floor) assembly utilized in the construction field.

Fabricators of truss and other wooden members that utilize such perforated, spiked metal connecting plates can without any trouble nail or press these connecting plates in place very fast. However, it is totally different when it comes to removing such embedded spiked metal connecting plates. Suffice it to say that it is very difficult to remove such a metal connecting plate from one or more wooden members. Apparently, there are no special tools available for use in removing such metal connecting plates. Because of the nature of the plates themselves and how they are fastened to wooden members, it is virtually impossible to practically remove these plates with conventional tools.

Today, there is in fact a need to remove such metal connecting plates. One reason to remove the plates is for the purpose of being permitted to dump scrap wood members. In certain localities it is not permitted to dispose of wood at dump sites that include such metal plates. In addition, there is a need to have the capability to salvage scrap wood that include these metal plates embedded into the wood. In order to effectively salvage and make use of such scrap wood, it is important that these metal connecting plates be removed.

Therefore, there has been and continues to be a need for a tool and a process for effectively removing metal spiked connecting plates from wood members.

SUMMARY AND OBJECTS OF THE INVENTION

The present invention entails a tool designed specifically to remove spiked metal connecting plates from one or more wooden members connected together by the metal connecting plate. Accordingly, the tool of the present invention includes a claw head that comprises a series of laterally spaced claw fingers. The claw fingers are particularly spaced such that they align with the perforated openings formed through the metal connecting plate. Thus, the respective claw fingers can be inserted downwardly through the top or exposed side of the connecting plate and through various perforated openings formed therein. Then by engaging the back side of the connecting plate with a prying action, the connecting plate can be, in a step-by-step fashion, peeled away from the underlying wooden members.

Also the present invention entails a method or process for removing the metal connecting plate. In this regard, the tool is first interposed between the wood and one edge of the metal plate and that edge is effectively pried up resulting in the edge being at least slightly separated from the adjoining wood member. Thereafter, the tool is inserted through the exposed face of the plate and particularly the claw fingers are inserted through the respective perforated openings in the plate. Thereafter, the tool is manipulated so as to peel or remove the plate from the underlying connected wood members. To effectively remove the connecting plate, it is important that the tool first be inserted in an area adjacent the peeled up edge and thereafter that the tool is repeatedly inserted through the perforations in the metal plate adjacent the prior area that was just pried up from the wood members. Thus, it is appreciated that the process entails reinserting the tool at various areas across the metal connecting plate.

It is therefore an object of the present invention to provide a tool for removing spiked metal connecting plates from one or more wood members that is simple in design, durable and which is easy to use.

Still a further object of the present invention resides in the provision of a method or a process for effectively and efficiently removing a metal connecting plate of the type having spikes extending from the back side thereof from one or more wood members.

Still a further object of the present invention resides in a tool of the character referred to above that can easily be modified to accommodate connecting plates having various sized or spaced perforated openings formed therein.

Other objects and advantages of the present invention will become apparent and obvious from a study of the following description and the accompanying drawings which are merely illustrative of such invention.

DETAILED DESCRIPTION OF THE INVENTION

Figures 1, 2:
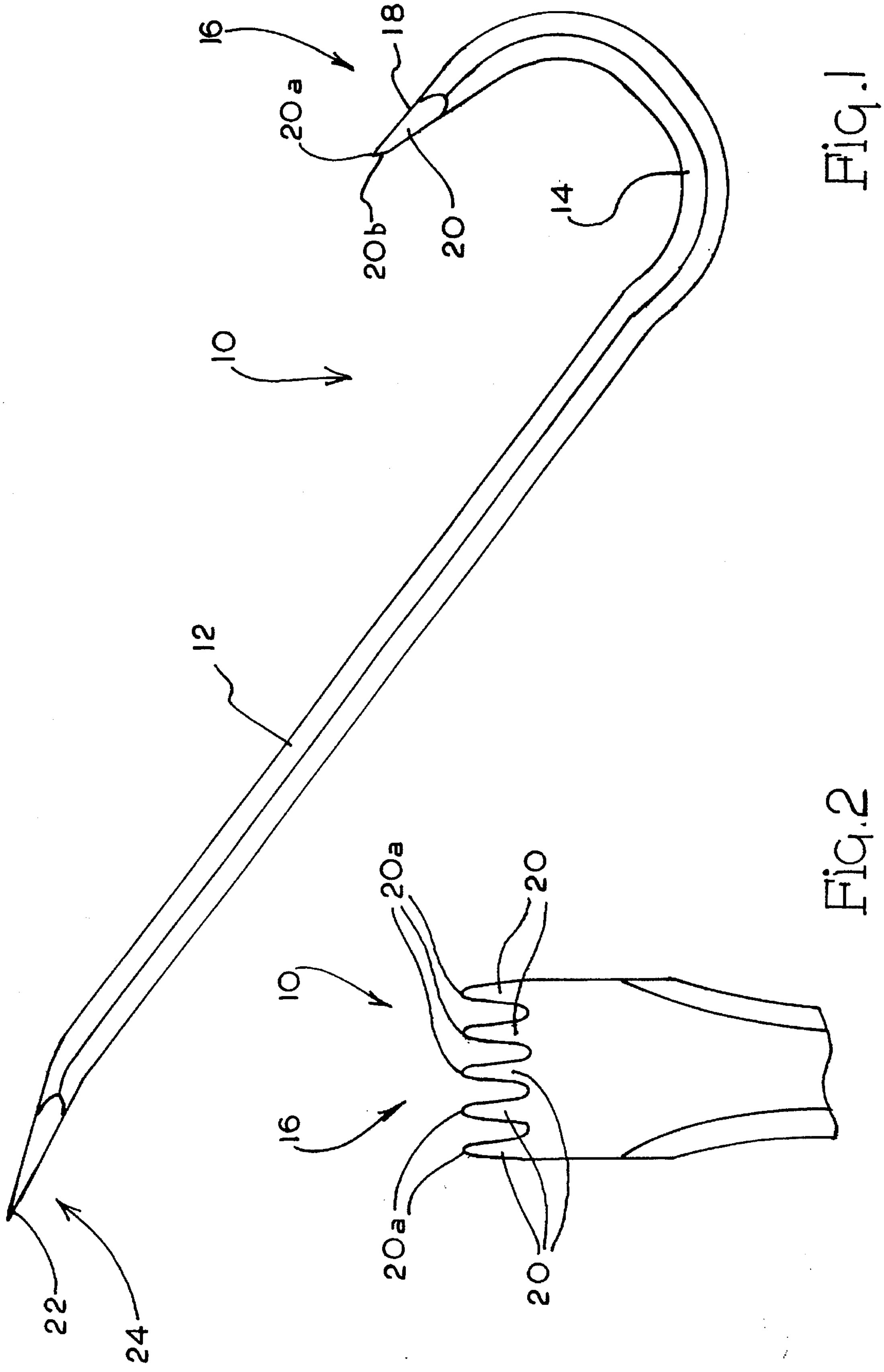
FIG. 1 is a side elevational view of the tool of the present invention.
FIG. 2 is a fragmentary top plan view of the claw head of the present invention.

With further reference to the drawings, the tool of the present invention is shown therein and indicated generally by the numeral 10. As will be appreciated from subsequent portions of this disclosure, tool 10 is specifically designed to work in conjunction with a conventional spike-type metal plate indicated generally by the numeral 30. More particularly, tool 10 is designed to remove the metal plate 30 from one or more adjoining wood timbers. As will be appreciated from subsequent portions of the disclosure the tool 10 is designed to be inserted into perforations formed in the metal plate in such a fashion that respective claws or teeth of the tool are utilized to pry the metal plate upwardly from the wood timbers and to accordingly extract or remove the spikes that project from the metal plate 30 from the wood timbers.

Now viewing the tool 10 in more detail, it is seen that the same can assume the basic look or configuration of a wrecking bar. Tool 10 preferably includes a handle 12 and formed about one end of the handle is a curved neck 14. Formed on the remote end of the curved neck 14 is a claw head that is indicated generally by the numeral 16. Claw head 16 is designed to fit into the perforations of the metal plate 30 and is specifically designed to peel or remove the metal plate 30 and its associated spikes from one or more wood timbers.

Continuing to refer to claw head 16, it is seen that the same includes a plurality of fingers 20. In the case of the present disclosure, the claw head is provided with five laterally spaced fingers 20 but it should be understood that the number of fingers can vary depending upon need and application. Each finger includes an outer remote end tip 20*a*. As seen in the drawings, the respective fingers 20 are tapered to the end tip 20*a*. Also, the claw head 16 and consequently the individual fingers 20 include a flat bottom 18. Each individual finger 20 includes a slightly arc top surface 20*b* that extends from the tip 20*a* back over the top of the individual finger 20.

The respective fingers 20 are particularly laterally spaced so as to fit within the openings or perforations 32 formed in the galvanized metal plate 30. Note that the metal plate 30 includes a front face 30*a* and a back side 30*b*. Metal plate 30 is a conventional fastening member used to connect wood timbers that form a part of a composite wood structure such as roof or floor truss or the like. As seen in the drawings, the metal plate 30 includes a uniform pattern of openings or perforations 32. In the process of forming these openings or perforations 32, a multiplicity of spikes 34 are formed on the back side 30*b* of the metal plate 30 and project therefrom for insertion into the one or more wood timbers that are connected by the metal plate 30. As seen in the drawings, in the process of manufacturing the metal plate 30 and forming the perforations or openings 32, each opening 32 forms a pair of laterally spaced spikes 34. Thus, it is appreciated that the individual spikes 34 project from opposite ends of the respective perforated openings 32 formed in the metal plate 30.

Figure 3:
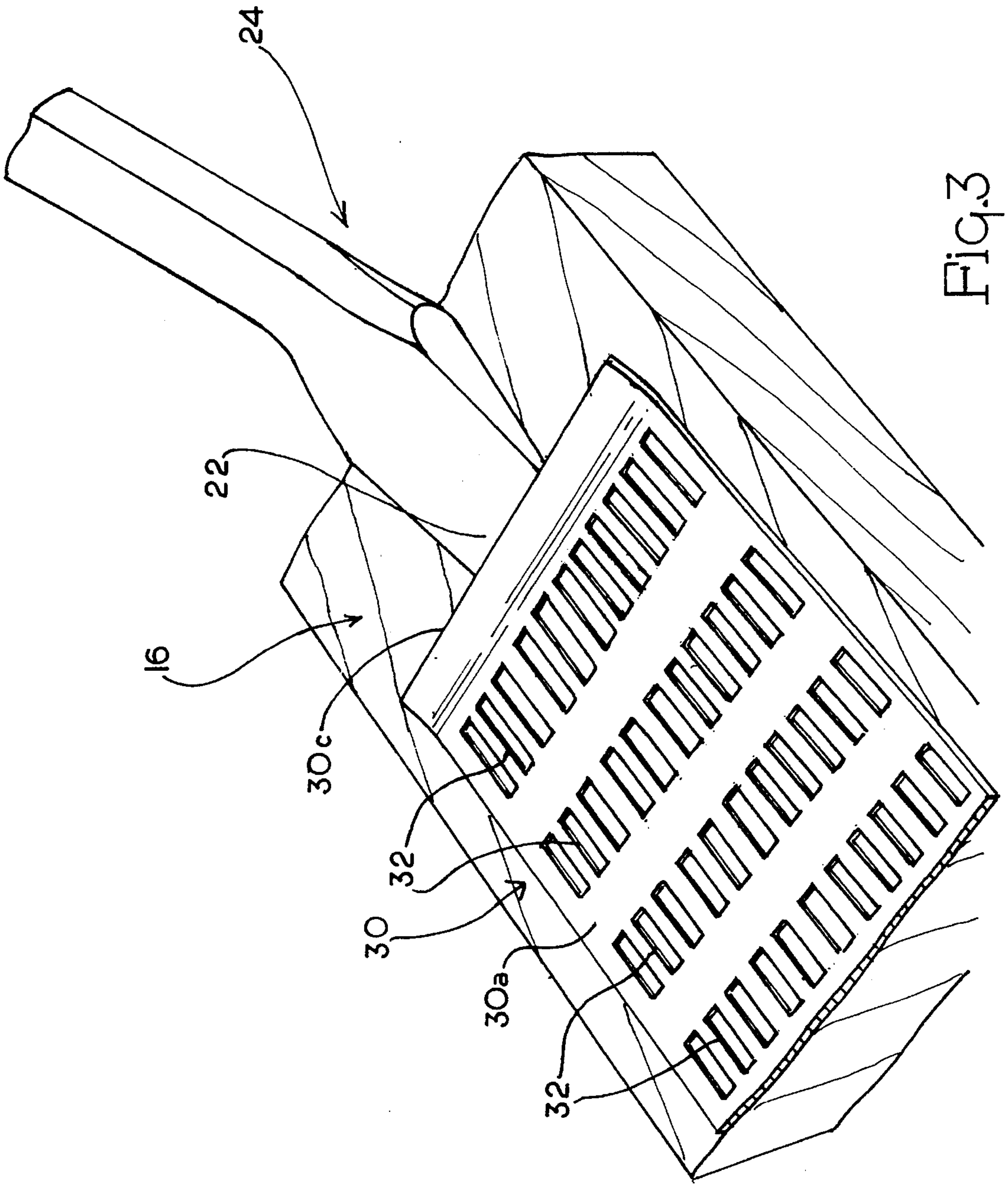
FIGS. 3–5 are a sequence of views illustrating how the tool of the present invention is utilized to remove a spiked metal plate from a wood member.
Figure 4:
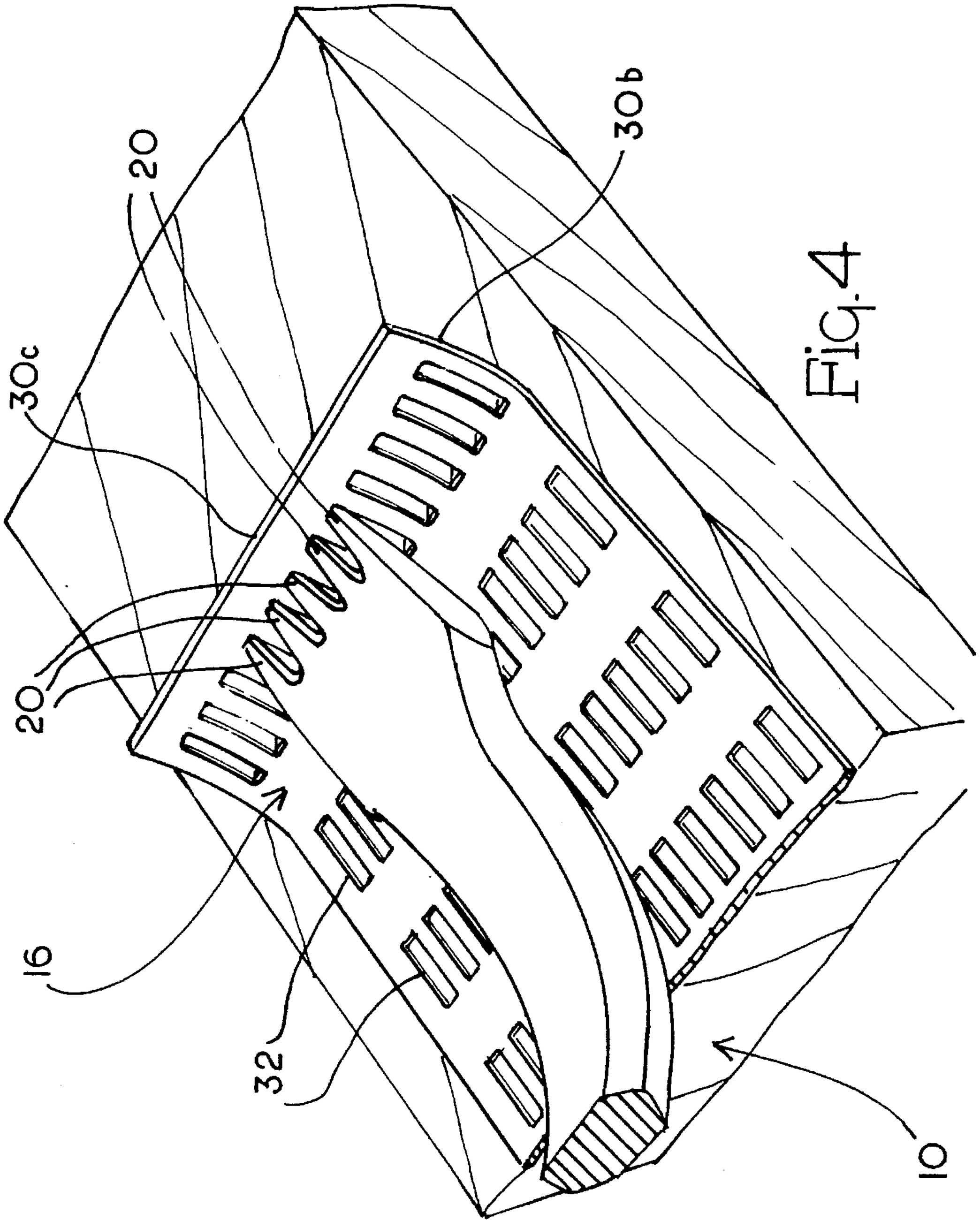
Figure 5:
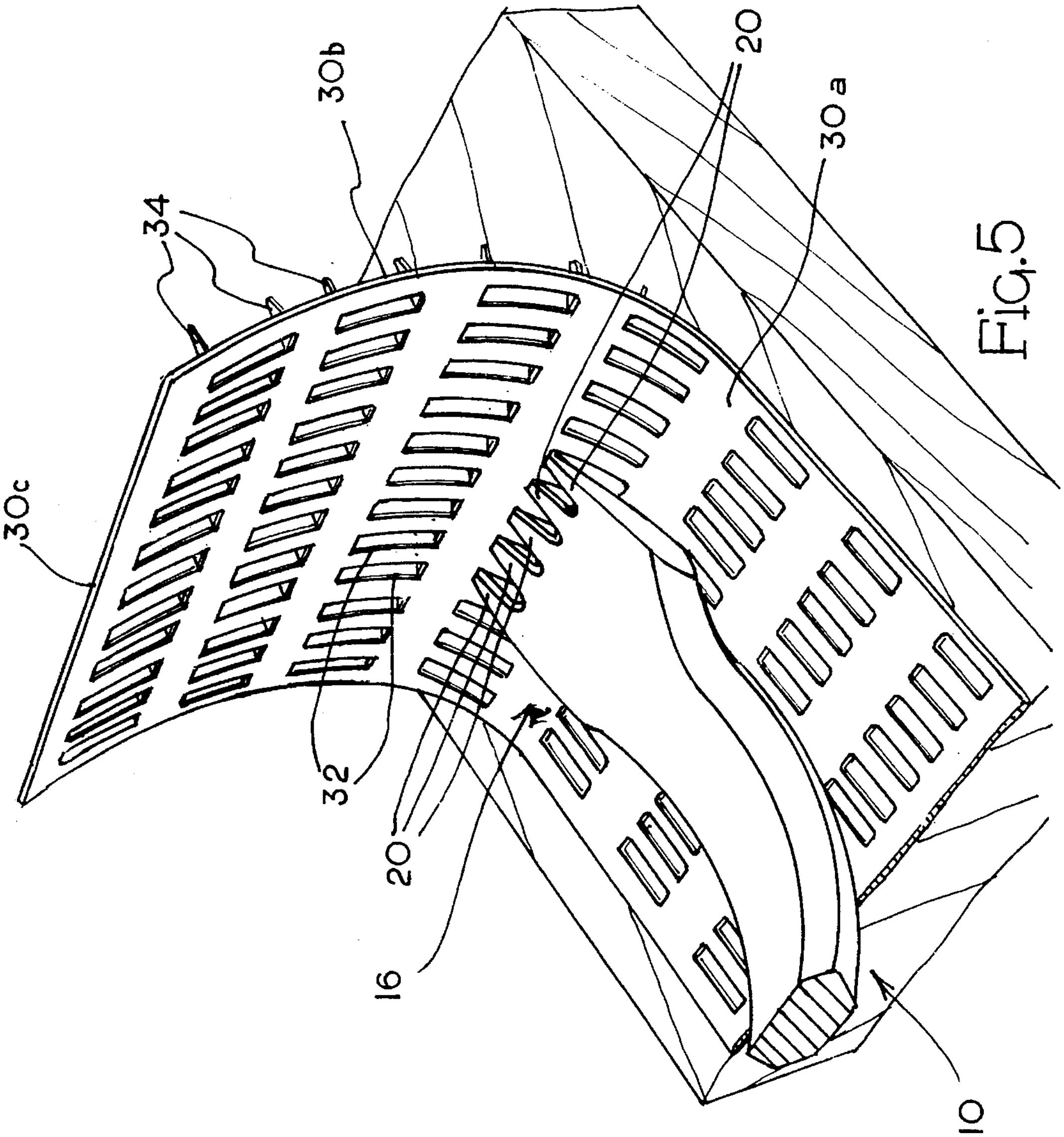

Turning to a discussion of the use of the tool 10, first to remove a metal plate 30 from one or more wood members, the blade end 24 of the tool is used. In particular, the sharp blade 22 is inserted between edge 30*c* of the metal plate 30 and the underlying wood timber. See FIG. 3. The handle 12 of the tool is articulated such that the blade end 24 of the tool 10 tends to pull the edge 30*c* of the metal plate 30 upwardly and away from the underlying wood member. Thus, the first step of the process in removing the metal plate 30 entails at least slightly separating one edge 30*c* of the metal plate 30 from the underlying wood member.

Next, the method or process of the present invention entails inserting the claw head 16 downwardly through the face 30*a* of the metal plate 30 and peeling the metal plate 30 from the wood timbers. To accomplish this, the tool 10 is first applied in an area closely adjacent the first separated edge 30*c* of the metal plate 30. It is important to apply the tool 10 in an area closely adjacent a previously separated or lifted area. Therefore, the respective fingers or claws 20 of the claw head 16 are projected downwardly through perforations 32 that are disposed closely adjacent the edge 30*c* of the metal plate that has been lifted or separated from the underlying wood member. The fingers 20 are particularly spaced such that they align with the centers of the respective openings 32 of the metal plate 30. Thus, the respective fingers or claws 20 can be inserted through the openings 32 of metal plate 30 and when wedged between the back side 30*b* of the metal plate 30 and the underlying wood member. Note that the fingers or claws 20 are always directed in the direction of the portion of the metal plate 30 that has been lifted or separated from the wood member. By articulating the handle 12 it is seen that the fingers 20 tend to lift and pull the metal plate 30 and spikes 34 upwardly from the wood member.

Therefore, as seen in the drawings, the respective fingers 20 when articulated and when engaged with the back side 30*b* of the metal plate 30, tend to cause the portion of the metal plate lying above the claw head 16 to curl in the removal process.

Although the tool 10 may be shifted laterally back and forth along the same line of perforations 32, it is contemplated that the entire width of a conventional metal plate 30 can be removed by manipulating the claw head 16 in one area of the metal plate 30. It should be pointed out that in cases where the metal plate 30 is wide that the tool 10 can be moved laterally from one area to another to pull the underlying areas from the wood member. It is appreciated that to dislodge the metal plate 30 that the tool 10 of the present invention is progressively moved from one spot to another spot during the dislodging process. In this regard, the claw fingers 20 are always inserted in an area adjacent an area that was just separated from the underlying wood. Thus, the tool 10 makes use of the slight separation that exists because of the prior manipulation of the tool 10. Expressed in another way, the tool is always inserted through the openings 32 in the plate 30 in close proximity to a raised or elevated area of the plate that resulted from a prior action of the tool 10.

It is thusly seen that the tool is progressively moved from one edge of the plate to an opposed edge of the plate and that during this process the plate 30 tends to curl as particularly illustrated in the drawings. The curled response of the plate 30 is caused in part at least by the curved shaped neck 14 of the tool. The curved shaped neck 14 gives rise to the peeling action of the plate 30.

The tool 10 of the present invention can be manufactured in various conventional processes. For example, the claw head 16 can be formed through a conventional drop forging process or in the alternative and in the way of an example, the same can be manufactured through a grinding process.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A method of removing a metal connecting plate from at least one wood member where the metal plate includes a series of perforations formed therein and a multiplicity of spikes that extend from a back side of the plate into the wood, the method comprising:

a) wedging a plate removal tool having a sharp edge and claw fingers between the at least one wood member and the back side of the metal plate and particularly pushing and wedging the tool underneath one edge of the plate that is fastened by the spikes to the at least one wood member;

b) wedging the edge of the metal plate away from the at least one wood member so as to create a space between the wood and the edge of the metal plate thereby creating a separated edge;

c) removing the tool from between the plate and the at least one wood member;

d) inserting the claw fingers of the tool downwardly through the top of the metal plate and into and through a first series of perforated openings in the plate adjacent the separated edge;

e) moving a handle associated with the tool and causing the claw fingers to lift the metal plate and the adjacent spikes away from the at least one wood member;

f) removing the claw fingers from the first series of perforated openings and continuing to move the tool and claw fingers across the face of the plate and repeatedly inserting the claw fingers downwardly through the face of the plate and through additional series of perforated openings formed therein and prying the area of the plate around the claw fingers upwardly from the at least one wood member; and g) wherein each successive insertion of the claw fingers through the face of the plate and through adjacent perforated openings being done at a location adjacent a previous area pried up such that groups of said spikes are pulled up from the wood, followed by adjacent groups of spikes until the entire metal plate has been separated from the at least one wood member.

2. A tool for removing a metal perforated connecting plate from one or more wooden members wherein the perforated metal connecting plate includes a multiplicity of spikes extending from the back side of the plate which project into the one or more wooden members to effectively connect the plate to the one or more wooden members, the tool comprising: a handle; a curved neck formed on one end of the handle, with the neck including a remote end; a claw end formed on the remote end of the neck; the claw end including a plurality of laterally spaced fingers with the fingers being particularly spaced with respect to the perforated metal plate such that each of the laterally spaced fingers may simultaneously project through perforations formed in the metal plate; wherein each claw finger is sized such that the same may be projected through a perforation in the metal plate and moved to engage a portion of the back side of the metal plate so as to pry the metal plate away from a connected wooden member; and a wedge end formed on the handle opposite the claw end for wedging between an edge of the metal plate and the one or more wooden members to at least slightly separate the edge of the metal plate from the underlying wood member, the wedge end including a terminal sharp blade end and a wedge extending from the blade back towards the handle.

3. A tool for specifically removing a spiked metal plate from one or more wooden members comprising: a claw head having a plurality of laterally spaced claw fingers with the respective claw fingers being particularly spaced to extend into and through a plurality of perforations formed in the metal plate and wherein the claw fingers are sized and spaced such that the fingers may pry the underside of the metal plate and the spikes associated therewith from an underlying and attached wooden member.

4. The tool of claim 3 wherein the respective fingers are tapered to a point.

5. The tool of claim 4 wherein the claw head includes a generally flat bottom.

6. The tool of claim 5 wherein each of the claw fingers includes a slightly curved shaped top portion that extends from the tip back towards a main body portion of the tool.

7. The tool of claim 3 including a wedge and blade end formed opposite the claw head with the wedge and blade end including a wedge having a terminal blade that is relatively sharp and wherein the blade is operative to be inserted between an edge of the metal plate and an underlying connected wood member.

* * * * *